United States Patent [19]
Horiguchi et al.

[11] Patent Number: 6,073,157
[45] Date of Patent: *Jun. 6, 2000

[54] PROGRAM EXECUTION IN A SOFTWARE RUN-TIME ENVIRONMENT

[75] Inventors: Tsuneo Horiguchi; Stephen Sherman Miller, both of San Jose; Alfred William Shannon, Morgan Hill; William David Wallace, San Jose, all of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/476,939

[22] Filed: Jun. 7, 1995

Related U.S. Application Data

[62] Division of application No. 08/203,728, Feb. 28, 1994, Pat. No. 5,666,533, which is a continuation of application No. 07/755,887, Sep. 6, 1991, abandoned.

[51] Int. Cl.[7] .................................................. A61L 3/00
[52] U.S. Cl. ............................................................ 709/100
[58] Field of Search ................................... 395/705, 701, 395/702, 703, 704, 706, 707, 708, 709, 710; 709/100

[56] References Cited

U.S. PATENT DOCUMENTS

| | | | |
|---|---|---|---|
| 4,685,125 | 8/1987 | Zave ............................................ | 379/96 |
| 4,694,396 | 9/1987 | Weisshaar et al. ...................... | 364/300 |
| 5,014,192 | 5/1991 | Mansfield et al. ...................... | 364/200 |
| 5,047,925 | 9/1991 | Kun et al. ................................ | 364/200 |
| 5,060,150 | 10/1991 | Simor ...................................... | 314/200 |
| 5,165,018 | 11/1992 | Simor ...................................... | 395/300 |
| 5,666,533 | 9/1997 | Horiguchi et al. ...................... | 395/670 |

FOREIGN PATENT DOCUMENTS 0 362105  4/1990  France ............................... G06F 9/46

OTHER PUBLICATIONS

Gore, Andrew, ACIUS Plans Object Oriented Tool, MacWEEK,v5,n18, pp. 1–2, May 1991.

OSF, OSF–DCE Application Development Reference, Prentice Hall, pp. 1–30,37,43,48, Dec. 1993.

Stevens, Advanced Programming in the UNIX Environment, addison–Wesley, pp. 188, 195, 207, Dec. 1992.

*Primary Examiner*—Alvin E. Oberley
*Assistant Examiner*—St. John Courtenay, III
*Attorney, Agent, or Firm*—Sterne, Kessler, Goldstein & Fox P.L.L.C.

[57] ABSTRACT

A method and system for managing computer program execution is implemented in a set of callable run-time support services which allow processes written in single or multiple languages to cooperate and behave in a predictable and orderly manner. Three key program execution constructs are defined: process, enclave, and thread. The process is the highest level construct of the program execution. It consists of one or more enclaves. The enclave defines the scope of execution semantics defined by the high level languages. This includes the scope of application termination and the scope of name resolution for shared data, files and procedures. The enclave consists of one or more threads. The thread is the basic program execution unit with its own state of execution. A thread may execute concurrently with other threads. A thread may consist of a series of call invocations of procedures. These procedures may be written in different high level languages. The callable services provide means for creating and terminating these constructs. A request to terminate a process results in termination of all the enclaves (including threads) in the process. Terminating an enclave terminates all threads in the enclave. The termination request may be combined with signaling a termination condition allowing execution of registered condition handling exit routines.

22 Claims, 5 Drawing Sheets

PROGRAM EXECUTION IN A SOFTWARE RUN-TIME ENVIRONMENT

This application is a division of application Ser. No. 08/203,728, filed Feb. 28, 1994, (status: patented Sep. 9, 1997 now U.S. Pat. No. 5,666,533), which is a continuation of application Ser. No. 07/755,887 filed Sep. 6, 1991, now abandoned.

RELATED APPLICATIONS

The present application is related to applications filed on the same date titled "METHOD AND SYSTEM FOR REPRESENTING AND SIGNALING RUN-TIME PROGRAM CONDITIONS" now U.S. Pat. No. 5,455,949 and "PROGRAM CONDITION HANDLING" now U.S. Pat. No. 5,630,137.

TECHNICAL FIELD

The present invention relates to methods and systems in the field of program execution management in a computer system.

BACKGROUND OF THE INVENTION

The various high level languages for computer programing (C, COBOL, FORTRAN, PL/I, . . . ) all have different definitions and models for run-time execution of application programs. These models define the run-time semantics of software applications. Besides being inconsistent, these models only apply to applications that are written entirely in one programing language.

The various operating system environments in the computer industry also have different models of application program execution. For example, the IBM MVS, OS/2, CICS, and OS/400 operating systems present the programmer with strikingly different environments for executing applications. As a consequence difficulties may arise in structuring and writing application programs so that they may be used in more than one environment.

Various industry standards have tried to address many of these problems. However, industry standards have applied primarily to single languages, or to single operating system environments, and have not attempted to unify multiple languages and operating environments simultaneously. See for example programing language standards:

American National Standard for Information Systems—Programming Language COBOL, X3.23-1985

American National Standard for Information Systems—Programming Language FORTRAN, X3.9-1990

American National Standard for Information Systems—Programming Language C, X3.159-1990

Operating environments:

IEEE Standard Portable Operating System Interface for Computer Environments, IEEE Std. 1003.1-1988. (Also known as POSIX.)

X/Open Common Applications Environment.

What is needed and not provided by the prior art is a method and means for managing program execution that unifies the widely disparate models presented by various high level language and operating system standards. The invention described below defines a model for execution of applications that are constructed out of multiple program subcomponents, are potentially written in multiple programing languages, and may be used in more than one operating system environment, with consistent and well defined behavior.

TERMINOLOGY

The following terms are used in this specification:

Activation

A program activation is an execution instance of the program, ready to run. (Actually running the program is a separate step—see the definition of "invocation.") High level language programs may have shared and non-shared parts. Typically, the shared part includes instructions and constants, while the non-shared part—unique to each activation—comprises the static data and so on. An activation denotes not only the physical allocation of the non-shared storage but also the values within it. Thus, the first time a program is run within an enclave, the activation for its static storage does not exist, until its unique storage is both allocated and initialized.

Condition Severity Codes will be used ranging from 0 to 4 width 0 being the least severe.

Condition Manager is any program or means which gains control of the computer system when a condition occurs and which manages the handling of that condition by executing various system and/or user application routines. It may be part of the operating system, run-time environment or an application program.

Cursor is an address pointer that points to an executable instruction.

Handle Cursor is the cursor that indicates both the handling routine and the stack frame for which the handler is invoked.

Heap Storage

An unordered group of occurrences of program storage areas that may be associated with programs running within a process. That is, the program storage areas of a particular type can be viewed as a heap where there is no logical ordering of the occurrences, and where the occurrence of a program storage area in the heap is determined by where it best fits.

Invocation

An invocation is an execution instance of a code "procedure" that has received control by a logical call/return mechanism. An invocation is distinct from an activation. A procedure may be involved multiple times for a given activation, and may even invoke itself recursively.

Platform is the combination of an operating system and computer hardware on which programs may execute.

Procedure

The output of one invocation of a compiler, i.e., compilation unit. A compilation unit corresponds to the smallest source sequence that can be separately compiled without changing semantics.

Resume Cursor is the cursor designating the point in the application where execution can be restarted.

Resume is the termination of condition handling, and the transfer of control to the instruction and stack frame denoted by the Resume Cursor.

Stack

A stack is a conceptual structure that supports procedure invocation (call/return). It consists of last-in, first-out elements known as "stack frames".

Stack frame

A stack frame is one element of a stack. A stack frame is created each time that a procedure is called and deleted when the procedure returns for the call. It is used to manage resources associated with the procedure invocation, execution and return.

Stack Frame Zero is the conceptual stack frame immediately prior to the stack frame for the first routine. It is the theoretical place where the thread or task is initialized, the first procedure is called from and termination is initiated from. For purposes of condition handling, the zeroth stack frame is the frame at which the default actions for a language are applied.

Static storage

A program's working storage that gets a new allocation the first time the program is run within an enclave and is not automatically deallocated when the program returns. Static storage is persistent across multiple runs of the program within an enclave.

SUMMARY OF THE INVENTION

The present invention is a method and system for managing program execution in a computer system by defining and supplying a set of callable run time support services which allow applications written in single or multiple languages to cooperate and behave in a predictable and orderly manner. The invention defines the concept of enclave, which defines high level language semantic scope, separate from process and thread and uses these constructs to implement a set of run-time services for managing a collection of procedures written in differing high level languages. An enclave is defined as a logical run-time structure that supports the execution of a group of procedures. The first procedure to be invoked within the enclave is known as the "main" procedure; the others are "sub-"procedures. The enclave limits the scope of high level language semantics, including shared storage, termination and condition handling. An enclave comprises one or more threads. A process is the outermost run-time structure whose characteristics are described by the run-time environment. There is no hierarchical relationship among processes. Rather, each process independently and asynchronously competes for some system resources, while owning others, notably a logically separate "address space." A process comprises one or more enclaves. The callable services provide means for starting and stopping multiple enclaves inside a process. Terminating one enclave does not affect the other enclaves which can continue to execute. The callable services provide means for starting and stopping multiple independent processes. Executing a request to terminate the process causes the service to automatically terminate all enclaves started in the process. An alternative method of termination allows signaling a termination condition before performing the termination to allow execution of defined exit handlers. Enclaves are permitted to have multiple threads. A thread is the basic unit of execution within the invention's execution environment program model. The resources that it owns are a machine state, a stack and a logically distinct condition manager. Each thread competes asynchronously for execution. One effect of the semantic scope limitation is that executing code for a high level language statement which requests the termination of the application causes only the enclave to be terminated. An example is the STOP RUN statement of COBOL.

DESCRIPTION OF THE PREFERRED EMBODIMENT

The invention is implemented as part of a common run-time environment called Common Execution Environment (CEE) for application programs which may be written in multiple high level languages (HLL). CEE includes a Common Condition Handler (CCH) including a Condition Manager. The invention focuses on two major areas. Firsts, defining run-time semantics for mixed language applications. This extends the existing language standards to define the behavior of applications with components written in multiple languages. Second, defining a model for building applications out of multiple subcomponent programs, focusing on the transfer of control between subcomponent programs and the interactions between them.

The invention defines a program execution architecture that enables separately compiled objects ("compilation units" or "procedures") to be bound and executed in different computing environments with consistent semantics. The architecture provides for serial, multi-tasking and transaction-oriented applications. The architecture factors in important application characteristics supported in targeted platforms, such as the multi-run-unit concept of transaction processing systems such as IBM's CICS and the multi-threading support of the OS/2 operating system. The architecture supports existing language semantics, while extending them in a consistent and natural way to support multi-language, multi-address space/node, multi-run-unit and multi-thread applications.

Implementation of the program management architecture on different platforms provides cross system semantic consistency (CSC) of application programs:

The high level language source statements remain identical across platforms.

The application writer interface (AWI) is identical on all platforms.

Application binding, activation, and name scoping achieve identical results on all platforms.

Program execution, data (local and external static, automatic) behave identically on all platforms.

Stack and heap storage are shared by all languages in a cooperative environment and behave consistently on all platforms.

Program Model

Program management defines the program execution constructs of an application, and the semantics associated with the management of such constructs.

Three key program management constructs, processes, enclaves and threads, are defined to support such applications. An application may consist of one or more processes. Processes do not share resources and are intended to be the application construct that may be distributed across address spaces or system boundaries. A process consists of one or more enclaves.

Figure 1:
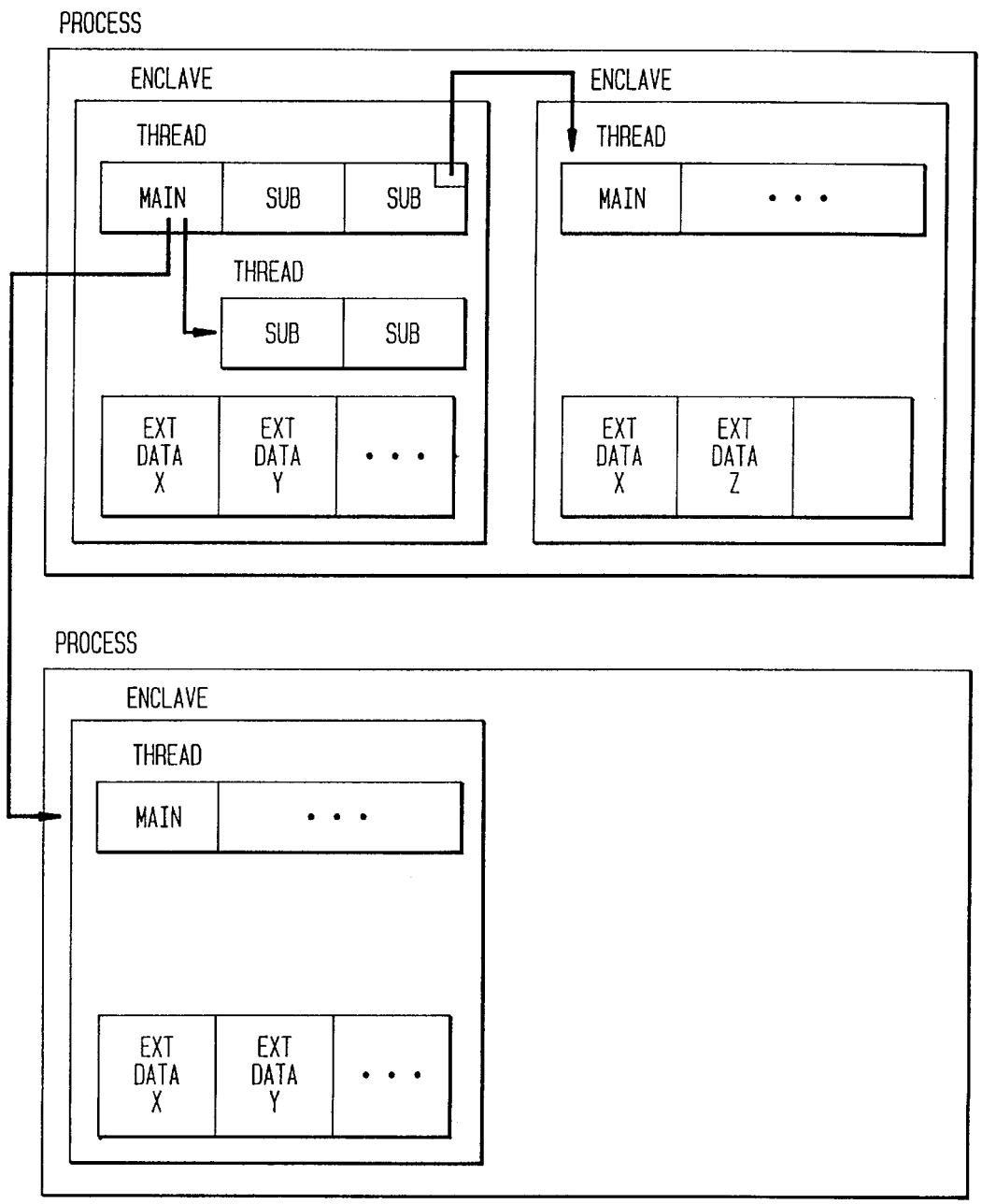
FIG. 1 illustrates the relationships between processes, enclaves, and threads as used in the invention.
Figure 2:
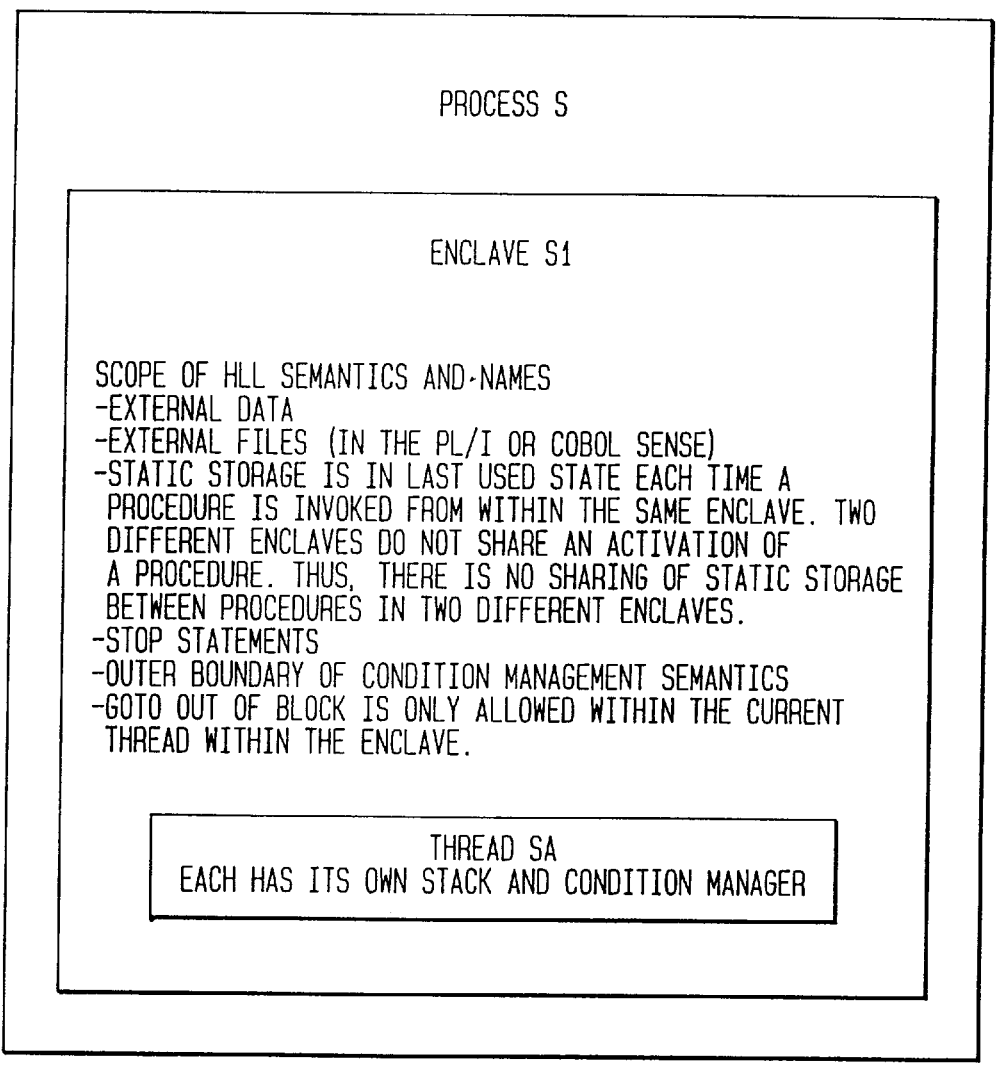
FIG. 2 further illustrates the relationships between processes, enclaves, and threads as used in the invention.
Figure 3:
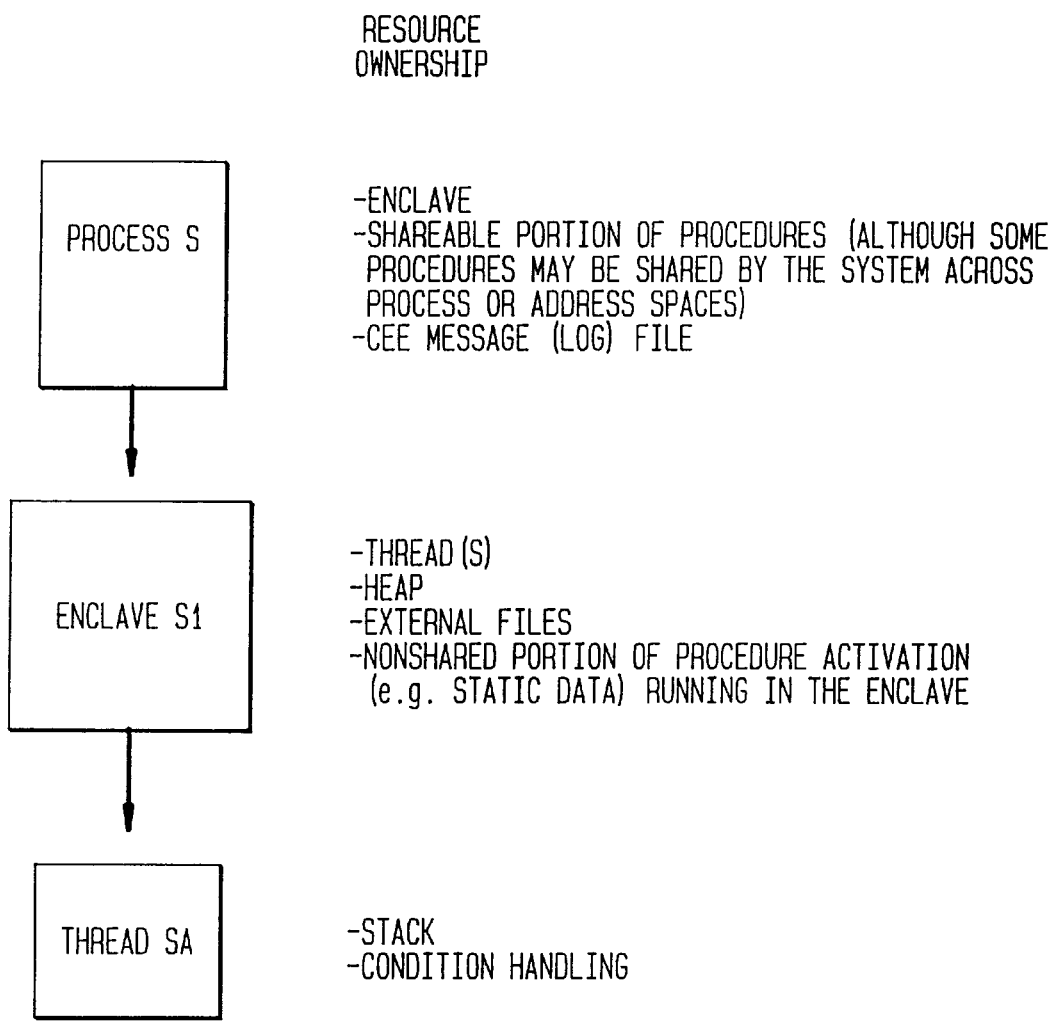
FIG. 3 illustrates the relationships between processes, enclaves, and threads in the execution of a simple process.

The enclave defines the scope of the language semantics for the component procedures. For example, it defines the scope of the language name resolutions, such as those for FORTRAN COMMON or COBOL external objects, or the scope of defining a main procedure and the associated language semantics. An enclave consists of one or more threads. FIGS. 1, 2, and 3 graphically show the relationships.

The thread is the basic unit of synchronous execution. It executes concurrently with other threads. It owns an associated stack reflecting active synchronous procedure invocations. It also owns an associated condition manager.

PROGRAM MANAGEMENT CONSTRUCTS

Processes

A process—the highest level component of the program model—is a collection of resources, both code and data, including at least one enclave. It has an associated address space which is logically separate from those of other processes. A process may comprise one or more enclaves.

All processes are independent of and equal to one another, in particular, they are not hierarchically related.

When a process is created, a character string argument may be passed to the process containing run-time options, similar to those that may be passed on a command line. Conventions for passing parameters to processes are platform-specific.

A process may create other processes. Processes in an application may communication using any inter-process communication (IPC) techniques available on the platform. Other than IPC mechanisms, no other resources are shared between processes. Resources that happen to be shareable because of platform specific implementations should not be exploited, since non-standard, non-portable applications will result.

A process can indicate, when creating another process, that the CEE should communicate to the creator the fact that the created process has terminated. This will be done using standard CEE inter-process communication facilities.

Enclaves

An enclave is a logical run-time structure that supports the execution of a collection of procedure activations ("activation set"). An unqualified use of the term "enviroment" is normally a reference to the execution environment for high level languages at the enclave level.

The enclave defines the scope of high level language semantics. Specifically:

The scope of the definition of the main procedure and the sub-procedures.

The first procedure invoked in the enclave is designed as the "main procedure" (MAIN). All the others are invoked as "sub-procedures" (SUB). (The thread containing the "main procedure" is the last thread to be terminated when the enclave is terminated.)

The first procedure invoked in the enclave must be capable of being MAIN according to the rules of the language in which the procedure is written. All other procedures invoked in the enclave must be capable of being SUB according to the rules of the language(s) in which the procedures are written. This includes, for example, binding rules as well as source language or compiler directive specification rules of the language.

Note that if a procedure is capable of being invoked as either MAIN or SUB, and recursive invocations are allowed according to the rules of the language, then the procedure may have multiple invocations within the enclave, with possibly one of its invocations as the main procedure and others as sub-procedures.

The scope of sharing of external data (e.g., COBOL. or PL/I external data, FORTRAN COMMON).

The scope of sharing of external files (e.g., COBOL or PL/I external file).

The language statements which terminate the execution of the outermost program unit known to the language (e.g., PL/I STOP, COBOL, STOP RUN) return control to the invoker of the main procedure of the current enclave.

Prior to returning, resources obtained by the procedures in the scope of the enclave are released (at least logically) and any open files are closed.

The target of GOTO out of block must be within the current thread of the enclave.

The scope and visibility of the following types of data:
automatic data: scope and visibility is a procedure invocation.
static local data: scope is the enclosing enclave, visibility is the invocations of the associated procedure within the enclave.
static external data: scope is the enclosing enclave, visibility is invocations of procedures in the enclave.

Static storage retains its last-used state for the life of an enclave.

Heap storage is shared among all procedures (and therefore, all threads) in an enclave. Heap storage allocated by a program in one language may be freed by a program in another language. Heap storage allocated by one thread remains until freed or the enclave terminates. Any thread may free the storage. In multi-threaded enclave. Common Execution Environment will serialize management of the heap. Explicit serialization by the application programmer is not required.

Outer bound of condition management semantics. The scope of condition management semantics is each thread within the enclave.

Invocations of the procedures within a thread are accomplished via CALL statements. A procedure invocation starting a new thread is accomplished via the thread creation service. The standard CALL statement, a function invocation, COBOL CALL identifier and CALL procedure__ variable are semantically equivalent calls.

One enclave may transfer control to another. CEE detects when EXEC CICS LINK and EXEC CICS XCTL have been executed and automatically start appropriate new enclaves. The callable service CEECREN is a direct mechanism that may be used to start new enclaves (in any environment, not just CICS). They result in synchronous invocation of a thread in a new enclave. That is, the thread that creates the new enclave "suspends" execution while the new enclave executes. Other threads in the creating enclave are unaffected. Enclaves may pass formal parameters by reference if the MAIN procedure of the target enclave can accept them. No other sharing of data associated with the application execution is allowed.

An enclave can have multiple threads. When an enclave terminates (by way of a STOP statement, for instance) all threads are terminated. The order in which the threads are terminated is unspecified, except for the initial thread of the enclave, and an application may not rely on any specific order of termination. The initial thread of an enclave is terminated last on the termination of the enclave.

Files may be shared across enclaves either through global naming conventions or cross enclave argument passing. Files that are opened within an enclave are implicitly closed if they remain open at enclave termination time. The implicit closing is performed by termination exit(s) of the member language(s) of the procedures in which the files are defined and opened.

The use of the message file is coordinated by CEE. If the message file name is the same between the creator and the new environment, the message file is not closed.

Threads

A thread is execution construct consisting of synchronous invocations and terminations of invocation units (including procedures). It is the basic program unit that the system dispatches with its own state for the execution path: instruction counter, registers, etc. A thread may execute concurrently with other threads. A thread may address all memory within the enclave but owns none of its own. A thread owns its own separate stack and defines the scope of the condition management semantics.

All threads within an enclave are independent of and equal to one another. In particular, they are not hierarchically related.

The following are further illustrations of the relationships among processes, enclaves, and threads in terms of resource ownership and sharing. FIG. 2 shows a simple case executing a procedure named SA with no multi-tasking. The dashed lined boxes indicate logical entities and solid boxes indicate where user code executes.

- When a procedure is executed from the command level, a process, an enclave and an initial thread are all implicitly created.
- These diagrams show logical ownership. Actual control block links are system dependent and are often driven by performance considerations.
- The procedures executing in thread SA may be composed of compilation units which resolve external names and instantiate static storage at various times: pre-execution binding, bind at load or bind at call. There is no assumption whatsoever of any preference of binding types.

Synchronized execution with multiple enclaves:

The requirement here is for thread SA to initiate QA with complete independence between the procedures in SA and those in QA. QA (like SA) is capable of being run from command level.

Figure 4:
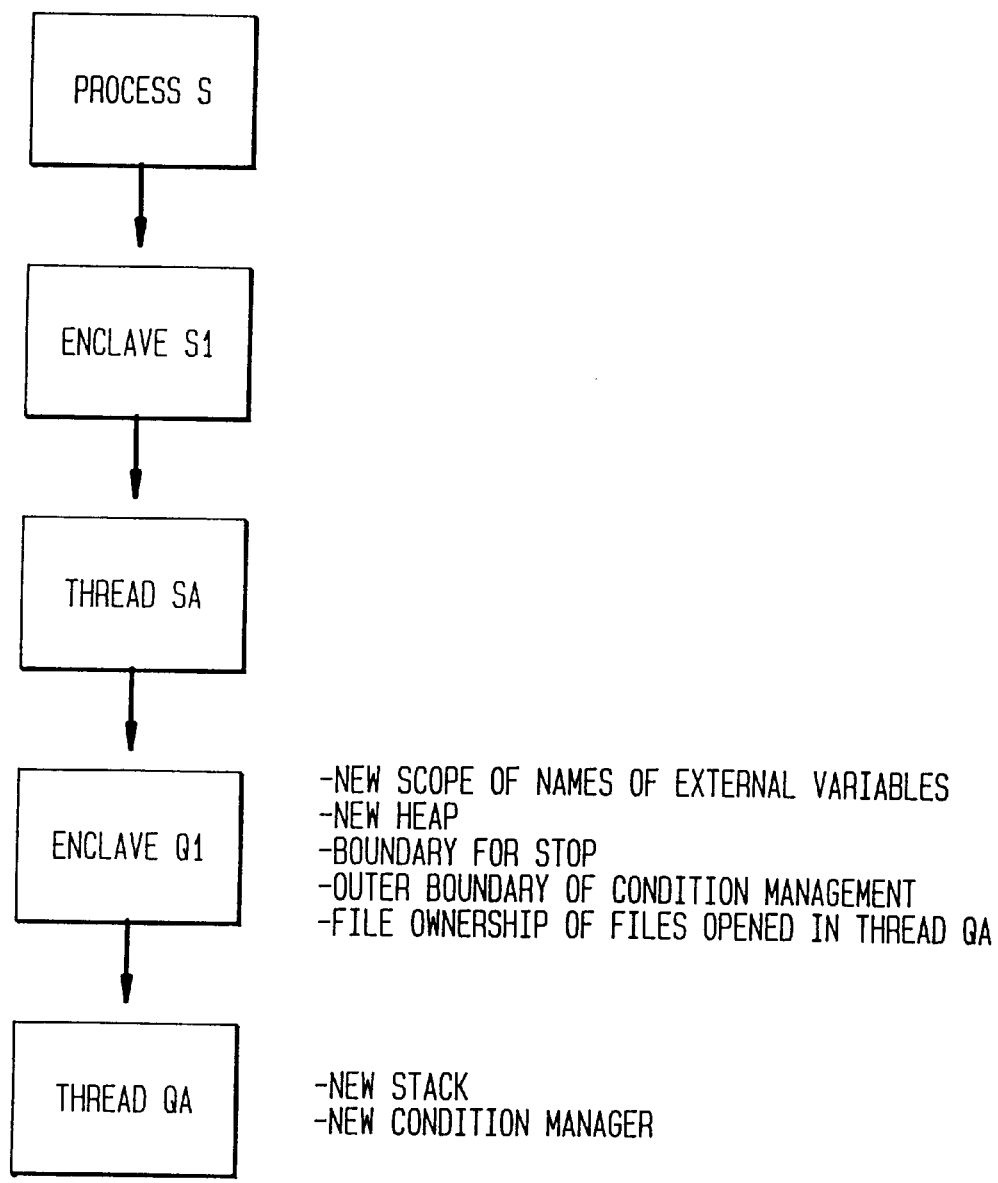
FIG. 4 illustrates the relationships between nested enclaves.

Reference is made to FIG. 4. Thread SA creates enclave Q1 nominating thread QA to execute. From an operating system point of view threads SA and QA may be the same "thread of execution," however, logically they are independent but synchronous in that S1 waits until Q1 completes.

Static data belonging to S1 is in a different name space from that belonging to Q1 and thus if a static external variable named "charlie" exists in both, then each program has its own copy of "charlie." The static data for Q1 is logically instantiated when enclave Q1 is created and is reclaimed when enclave Q1 terminates. Static data required in enclave Q1 is initialized when the enclave is created. Thus if enclave Q1 terminates and thread SA created a new enclave again nominating thread QA, a fresh copy of static is obtained (i.e., it's not in last used state from the previous enclave instance).

When enclave Q1 is created and terminated, the user and member exits are driven in the same manner as for enclave S1. New run options and user arguments are passed from S1 to Q1, the same as if Q1 were executed from command level.

The processing of user return code and the feedback code is the same for enclave Q1 as it is for enclave S1. When enclave Q1 terminates, the feedback code and the return code are passed back from Q1 to thread SA.

In general, conditions occurring in thread QA are totally independent of condition handlers established in thread SA. A feedback token and the corresponding return code that would be returned at command level is available to thread S1 when enclave Q1 terminates.

If the thread QA issues a language construct to terminate such as STOP RUN or CALL EXIT, only Enclave Q1 is terminated. Thread SA will receive a feedback code indicating how enclave Q1 terminated.

A GOTO out of block from any code in thread QA to a location not in thread QA is illegal.

In all multiple enclave or thread cases file synchronization is not provided in CEE and the user is dependent on facilities in the base operating system. Thus, if SA and QA access the same files, it is a user or system responsibility to ensure that the desired effects are obtained.

Figure 5:
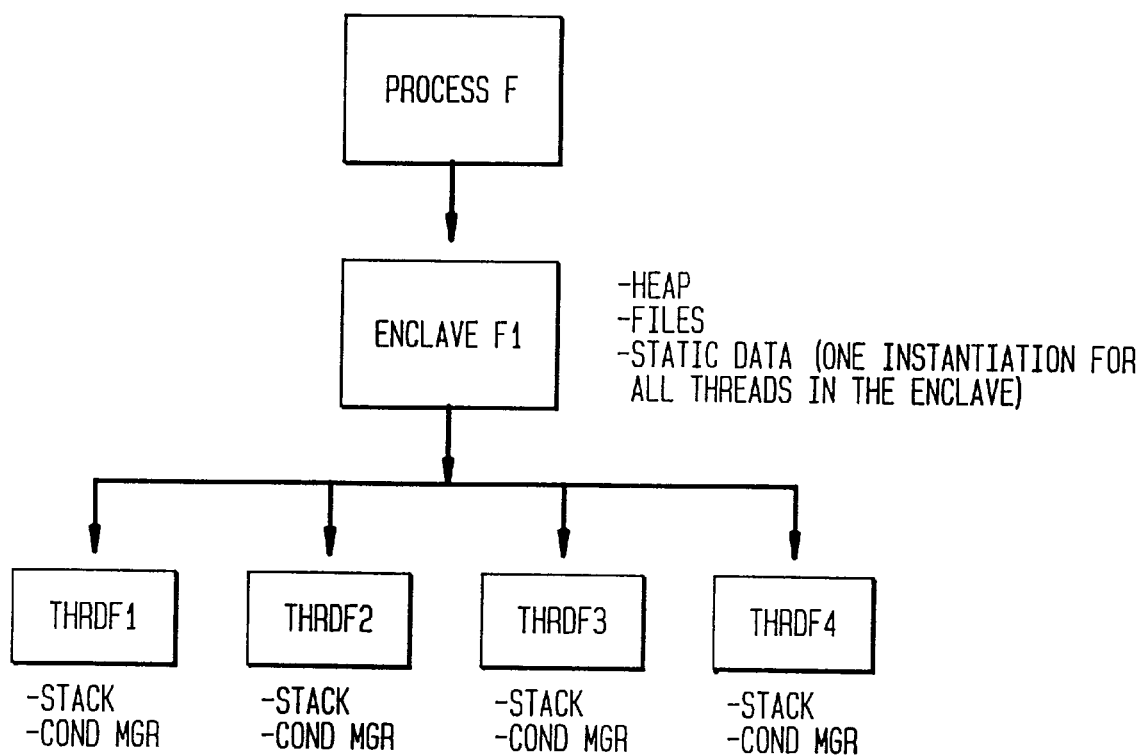
FIG. 5 illustrates the relationships between parallel threads.

Execution of multiple threads within an enclave: There is a requirement (as in FORTRAN parallel execution) for light weight threads of execution which share data easily and which divide a single task up into sections which can be executed on different processors simultaneously. Memory, however, must be shareable between the threads. These light weight threads must be cheap to create and dispatch in terms of processor overhead. See FIG. 5.

Note that the threads may share a single copy of static data and stack data may be shared via pointers and parameters.

The model was developed as an attempt to define the effects of high level language semantics in mixed language applications, and to integrate transaction processing and multi-threading into the program model. Concepts were developed for single-threaded applications and then extend for multi-threading.

CICS transaction processing combines enclaves in a CICS thread of execution. When one enclave transfers control to another, it may pass parameters which may be passed by reference and may include pointers. This implies that enclaves must be able to share memory in an application.

Applications may also be made of parts that do not share addressable memory. This can happen when either the hardware or the operating system allows for multiple address spaces. It can also happen when an application is distributed across multiple nodes in a system network. Thus, we are left with the requirement that enclaves in certain applications share memory, and the requirement that parts of an application can be distributed. Processes are the units within an application that can be distributed—within a process, enclaves may share memory by way of the arguments they pass.

Threads provide support for parallel processing. They allow an application to be split into multiple concurrent paths of execution, potentially improving clasped run time. They also provide a convenient way to structure a program (such as a device driver) that relics on asynchronous events. Independent stacks and exception handlers allow the threads to execute independently of each other. Thread creation, termination, and interaction must be very fast—the degree to which application can take advantage of parallel processing depends directly on the overhead involved in managing the parallelism. Thread management must be efficient enough to allow exploitation of parallelism within small regions of an application, such as in the parallel execution of a FORTRAN DO loop. Threads share the resources of the enclave, thus allowing them to be created without having to selectively create (activate) new copies of resources, code or data. The intent is to minimize the amount of work required to initialize a new thread.

When multiple thread are introduced, traditional high level language semantics have to be extends. The program model extends mixed language semantics to multi-threaded applications. The extension is consistent with single-threaded semantics and consistent with multi-tasking semantics in some languages. Many language concepts were first defined by their effect on the enclave. When extended to multi-threading, some of these were modified to affect the enclosing thread rather than the enclave, such as the stack and the condition manager. In other cases, like the STOP statement, its scope of effect remains the enclave, but its semantics are extended to terminate all the threads in the enclave. Multi-threading extends the semantics rather than changes them. In a single-threaded application, the semantics scoped by the thread still seem to be scoped by the enclave, but only because the single thread has the same scope as the enclave.

Callable Services

Callable services are defined that enable application programs to utilize the parts of the program model that extend the capabilities of native programming language syntax. The interface definitions below use the C language. The type definitions used below are not specifically defined herein, since the definitions will vary for each embodiment and are not critical for implementing the invention. The calling routines must, of course, use compatible parameter types and parameter passing conventions to those expected by all callable services.

CEECRPR—Create Process

Create a new process and start an initial thread executing within its initial enclave.

```
void CEECRPR(progam_name, run_opts. process_id. [fc])
    VSTRING  *program_name;
    VSTRING  *run_opts;
    INT4     *process_id;
    FEED_BACK *fc;
``` where:

program_name (input)
the name of the main procedure to activate, initialize and invoke in the initial enclave of the new process.

run_opts (input)
the run time options to control the new environment of the process.

process_id (output)
the process identifier of the new process.

fc (output/optional)
the feedback code indicating the degree of success in creating the new process.

Notes

1. A new process is created. A new enclave is initialized in the process with the given run-time options run_opts. An initial thread is created in the enclave which starts execution in program_name, which must be a main program.
2. The process identifier returned by the service should be used only to refer to the newly created process in other service calls. Any other use is undefined.
3. The new process executes asynchronously with the creating process.

CEEEXPR—Exit Current Process

Terminates all enclaves in the current process and terminates the current process.

void CEEEXPR

Notes

1. All enclaves in the process are immediately terminated without notification.
2. All resources in the process are released.

CEETRPR—Terminate Process

Terminates all enclaves in the indicated process, resulting in the termination of the process.

```
void CEETRPR(process_id. [fc])
    INT4      *process_id;
    FEED_BACK *fc;
``` where:

process_id (output)
the process identifier of the process to terminate.

fc (output/optional)
the feedback code indicating the degree of success in terminating the process.

Notes

1. All enclaves in the indicated process are immediately terminated without notification.
2. All resources in the indicated process are released.

CEECREN—Create Enclave

Create a new enclave, activate and invoke a main procedure within it.

```
void CEECREN(name, run_opts, user_arg, encl_fc, [fc])
    CEE_ENTRY *name;
    VSTRING   *run_opts;
    void      *user_arg;
    FEED_BACK *encl_fc;
    FEED_BACK *fc;
``` where:

name (input)
is an entry constant that refers to the procedure to be added to the "activation set" and invoked within the enclave as its main procedure.

run_opts (input)
is a character string that contains the CEE run-time options applicable to the execution of programs within the enclave.

user_arg (input)
is the argument to be passed to the first (main) procedure of the enclave.

end_fc (output)
is the feedback code produced by the execution of (the main procedure of) the enclave created by this call.

fc (output/optional)
is an optional parameter in which the callable service feedback code is placed.

Notes

1. The form and contents of the feedback code produced by the execution of the enclave are platform specific.
2. The user exits, if any, are driven during enclave initialization and termination.
3. The current thread waits for the new enclave to finish execution and return control to it. Other threads in the current enclave are not affected.
4. If no options are passed in run_opts, the default action is taken to create the options for the new enclave.
5. The CEE message file may be shared between enclaves in the process if the message file name is the same, either by default or by specifying the MSGFILE option in run_opts.
6. The user argument user_arg is passed by reference. It may be any type. If the user needs to pass multiple items, an array or structure may be passed, depending on the arguments expected by the main program to be executed in the enclave.

CEETREN—Terminate the Current Enclave

The function of the CEETREN service is to terminate all threads in the current enclave and to terminate the current enclave. A call to the CEETREN service results in the following actions:

1. Call the CEETRTD service once for each active thread. (The thread containing "main" is the last thread terminated.) The action of the CEETRTD service is as follows:
   a. Execute all registered stack frame termination routines, user first, then HLL, on each stack frame of the current thread.
   b. Execute the thread-level member termination exit (if any exists).
   c. Optionally provide an asynchronous signal to the creator of the thread indicating that the thread has terminated, if a signal was requested at thread creation time.
2. Calculate the enclave return code from the supplied parameters and/or the user return code field in the enclave-level control area.

```
void CEETREN([cel_rc_mod], [user_rc])
    INT4  *cel_rc_mod;
    INT4  *user_rc;
```

Where:
ccl_re_mod (input/optional)
   may be 0, 1, 2, or 3. If it is omitted or outside the above set, it is assumed to be ().
user_re (input/optional)
   is a number representing the user potion of the enclave return code.
   Notes
   1. This service never returns to its caller.
   2. All resources owned by the enclave are released.
   3. If the user_rc parameter is not supplied, the CEETREN services uses the contents of the user return code field in the enclave-level control area. If supplied it takes precedence over previously set values.
   4. The values 1,2,3 of cel_rc_mod are reserved for language-specific use.

CEETREC—Signal Termination_Imminent and Terminate Enclave

The function of the CEETREC service is to:
1. signal the Termination_Imminent condition on the current thread and if the resume cursor is not moved and a resume requested, processing will proceed as follows:
2. terminate all threads in the current enclave.
3. terminate the current enclave.

A call to the CEETREC service results in the following actions:

1. Call CEESGL and signal the Termination_Imminent condition on the current thread. If the resume cursor is not moved and a resume requested, processing will proceed as follows:
2. Call the CEETRTD service once for each active thread. (The thread containing "main," is the last thread terminated.) The action of the CEETRTD service is as follows:
   a. Execute all registered stack frame termination routines, user first, then HLL, on each stack frame of the current thread.
   b. Execute the thread-level member termination exit (if any exists).
   c. Optionally provide an asynchronous signal to the creator of the thread indicating that the thread has terminated, if a signal was requested at thread creation time.
3. Calculate the enclave return code from the supplied parameters and/or the user return code field in the enclave-level control area.
4. Optionally provide an asynchronous signal to the creator of the enclave indicating that the enclave has terminated.

```
void CEETREC([cel_rc_mod], [user_rc])
    INT4  *cel_rc_mod;
    INT4  *user_rc;
```

Where:
cel_rc_mod(input/optional)
   may be 0, 1, 2, or 3. If it is omitted or outside the above set, it is assumed to be ( ).
user_rc (input/optional)
   is a number representing the user portion of the enclave return code.
   Notes:
   1. This service never returns to its caller.
   2. All resources owned by the enclave are released.
   3. Normal termination of the enclave, by high level language STOP statements, is implemented by calling the CEETREC service, which raises the "Termination_Imminent" condition in the thread that issued the STOP statement. This allows for orderly termination of the enclave.
   4. If the user_rc parameter is not supplied, the CEETREC service uses the contents of the user return code field in the enclave-level control area. If it is supplied it takes precedence over previously set values.
   5. The values 1,2,3 of cel_rc_mod are reserved for language-specific use.

CEECRTD—Create Thread

Creates and initiates execution of new threads in the enclave.

```
void CEECRTD(name,event_name,thread_id,[stack_size],[arg],[fc])
    CEE_ENTRY  *name;
    struct CEESTOK *event_name;
    INT4  *thread_id;
    INT4  *stack_size;
    void  *arg;
    FEED_BACK *fc;
```

Where:
name(input)
   routine at which the new thread is to start execution.
event_name (input)
   the signal token to be signaled by Common Execution Environment when the thread terminates. If this argument is null or consists of only blanks, then no event will be signaled.
thread_id (output)
   the unique identifier generated by Common Execution Environment used to refer to the new thread in other Common Execution Environment services.
stack_size (input)

the non-negative initial size of the run-time stack for the new thread if it is omitted or blank, the size specified by run-time options will be used.

arg(input, output, in/out)

an argument to be passed to the code at address. Its type is determined by the requirements of the code called at address.

fc(output/optional)

the feedback code returned by the service. It will indicate the degree of success in creating the new thread.

Notes:

1. The new thread starts execution at the external procedure given in name.

2. The thread shares all resources of the enclave.

3. CEE provides a new stack.

4. The user must serialize use of shared resources, for instance, external data.

5. Arguments may be passed to the routine to be executed if the routine is declared to accept them. Output arguments and in/out arguments may be passed. Since the thread runs asynchronously with the creating thread, arguments passed by reference become shared variables and their use should be serialized, if necessary. Since the thread doesn't return to its creator, output arguments returned by value are lost.

6. CEE provides a condition manager for the thread.

7. thread_id is used to refer to the thread as input to other services. No other use of thread_id is allowed.

8. Success of thread creation will be reported by fc. This will not report on success of Common Execution Environment initialization in the new thread nor the successful execution of the code on the thread.

CEEEXTD—Terminate Current Thread

The function of the CEEEXTD service is to exit (terminate) the current thread. This is accomplished through the following steps in the specified order:

1. Execute all registered stack frame termination routines, user first, then HLL, on each stack frame of the current thread.

2. Execute the thread-level member termination exit (if any exist).

3. Optionally provide an asynchronous signal to the creator of the thread indicating that the thread has terminated, if a signal was requested at thread creation time.

void CEEEXTD

Note:

1. This service never returns to its caller.

CEETRTD—Terminate a Specified Thread

The function of the CEETRTD service is to terminate the specified thread. This is accomplished through the following steps in the specified order:

1. Execute all registered stack frame termination routines, user first, then HLL, on each stack frame of the specified thread.

2. Execute the thread-level member termination exit (if any exists) for the specified thread.

3. Optionally provide an asynchronous signal to the creator of the thread indicating that the thread has terminated, if one was requested at thread creation time.

```
void CEETRTD(thread_id, [fc]
    INT4    *thread_id;
    FEED_BACK  *fc;
```

Where:

thread_id(input)

the identifier of the thread to be terminated.

fc(output/optional)

is an optional condition token which indicates the degree of success in terminating the thread.

Note: Upon return from this service, it is indeterminate if the target thread has completed termination yet.

CEETRTC—Signal Termination_Imminent and Terminate Thread

The function of the CEETRTC service is to provide a convenient method for terminating the current thread after signaling the Termination_Imminent condition. Thus, a call to the CEETRTC service results in the following actions:

1. A call to the CEESGL, service with a FEED_BACK code specified, signaling the Termination_Imminent condition.

2. If the resume cursor is not modified, the CEEEXTD service is called to terminate the current thread.

void CEETRTC

Note: This service never returns to its caller.

Notes on Thread Termination:

If the thread being terminated is the thread that contains the "main" routine, CEE forces enclave termination by calling the CEETREN service. The CEETREN service generates the appropriate return code utilizing the user return code field in the enclave-level control area. The call to CEETREN is made without parameters.

The Termination_Imminent (T_I) condition: The Termination_Imminent condition is a CEE-defined severity 1 condition that may be signaled (by calling CEESGL), by an application or any member product, to indicate the intention to terminate the thread.

The T_I condition is processed as a normal condition. If it reaches stack frame ( ) unhandled, the CEE default action (which, for a severity 1 condition is to resume) will be applied.

Mixed Language Semantics

The main procedure of the enclave is the first procedure to receive control in the enclave. The first procedure invoked in the enclave must be capable of being MAIN according to the rules of the language in which the procedure is written. This includes, for example, binding rules as well as source language or compiler directive specification rules of the language. All other procedures to be invoked in the enclave must be capable of being sub-procedures according to the rules of the languages in which the procedures are written.

Note that some languages allow the same activation of a procedure to be invoked both as MAIN and SUB while others require the MAIN/SUB specifications to be explicitly specified at compile or bind time.

External data items are shared by name within the enclave. The following language constructs all refer to the same external data area named X.

| COBOL | 01 X EXTERNAL . . . |
| FORTRAN | COMMON /X/ . . . |
| PL/I | DCL 1 X EXTERNAL . . . |
| C | extern int X |

All procedures in the enclave must declare the external data to be the same length. Initialization may be done via language constructs of only one procedure in the enclave. Initialization must be achieved before the first use of the external data.

Call/Return between procedures works identically for all languages and between languages. Arguments to the called procedure can be passed independent of the language in which it is written, subject to any conventions which may be described for the overall architecture. The standard CALL statement, a function invocation, COBOL CALL identifier, CALL of an entry variable, and implicit call such as in C and PASCAL, are semantically equivalent calls. In particular, the semantics of external data sharing between called units are preserved whether procedures that are called are statically or dynamically bound—call semantics are independent of binding method. Inter-language CALLs may reference only external procedures, not nested internal procedures.

Languages have statements that have the effect of returning control to the invoker of the main procedure. Such statements, referred to here as STOP statements for convenience, have a scope of affect, and that scope is an enclave. Issuing a STOP has the effect of terminating all threads of the enclave, freeing all resources, and returning to the invoker of the main procedure of the current enclave.

Examples of explicit "terminate enclave" language:

|         |          |
|---------|----------|
| FORTRAN | STOP     |
| PL/I    | STOP     |
| COBOL   | STOP RUN |

STOP may also be implied, such as the return of control from a main procedure, such as COBOL GOBACK or the PL/I processing of the last END statement.

All conditions, whether raised by language syntax or signaled by CEE callable services, are equivalent. All languages with explicit syntax to handle conditions must be able to recognize and take action on conditions raised by any other language or CEE callable service. The basic scope of the condition manager is the thread.

Both PL/I and C have notions which support a branch across stack frame boundaries with orderly collapse of the skipped frames. Within the limits of existing language semantics, a program in any language may issue such a "GOTO" to a location in a procedure written in the same language. The target of the "GOTO" must be in the same thread that executes the "GOTO."

Summary of Related "PROGRAM CONDITION HANDLING" Invention

This related invention gives a method for common condition handling capable of handling programs written in a plurality of computer programming languages. A set of callable routines is compiled to implement the common condition handling (CCH) function. Compilers are modified to interact with the CCH and to create code to interact with the CCU. CCH is used in the preferred embodiment of the present invention. It provides a common, consistent framework for condition handling by all the languages present in a multiple language application. The CCH routines have callable entry points which are declared as external or entry variables which enables application programs to link to them. The application programs can then interact with the condition handling process by calling the entry points in the CCH when the program is executing. The CCH initializes the computer system's standard condition processing means to turn over control of the computer system to the CCH when selected conditions occur. The language support programs for the languages in which the program is written should preferably be modified to each have a language condition handling routine specific to that computer programming language. When the program, procedure or subroutine written in that language is entered, the CCH records that fact using a last-in-first-out (LIFO) queue or equivalent means to associate the language specific handlers (LSH) with the current stack frame. Thus, when multiple nested routines are processed, the CCH creates an ordered list of the LSHs so that it can determine which LHS is to be executed when specified conditions occur. The application program optionally registers User Handlers by invoking (calling) one of the external entry points of CCH. The User Handlers are also queued LIFO and associated with a current stack frame. When a condition is detected, the LSH last registered, i.e., the one on the top of the queue, is executed with a request that the condition be checked for enablement. The LSH does not process the condition at this point. If the LSH returns information indicating that the condition is not enabled, then the CCH will cause the execution of the program to resume where the condition occurred. If the condition is enabled, then the last User Handler registered will be executed. The User Handler and any other Handlers may respond to the CCH with one of three types of requests: Resume, Percolate, and Promote. The Resume Request indicates that the condition was handled and no further processing needs to occur. If the User Handler Percolates or Promotes the condition, the CCH will execute the next User Handler on the quene. Once all of the User Handlers have been executed, the last entered LSH will be executed. It can also respond with one of three requests. If all of the Handlers associated with a stack frame have been executed and none has handled the condition, then the Handlers for the next oldest stack frame will be executed. A logical stack frame zero is maintained which may have a LSH associated with it. The CCH has its own condition handler associated with stack frame zero. When a routine completes its stack frame is released and the associated handlers are removed from the queue.

The Promote Request requests that the condition be redefined as another condition. The Percolate Request requests that the condition be reprocessed by a second condition handling routine. The Resume Request requests that execution be resumed in the code at the point indicated by the Resume Cursor because the condition has been handled. The CCH then processes the Promote, Percolate or Resume request by performing the requested action. In addition, a Resume Cursor is maintained which may be moved (changed) at the request of the Handlers.

A separate means is provided for registering Exit Handlers, so that the Condition Manager does not concern itself with normal exit handling. This separation allows it to satisfy existing language requirements while simultaneously allowing the implementation of a more powerful and robust mechanism. In particular, it is the separation of exit handling that provides the basis for "rollback," and the restoration of data integrity.

A Handler may request termination of the thread, enclave or program in which the condition occurred by calling a routine in the CCH.

Summary of Related Invention: "METHOD AND SYSTEM FOR REPRESENTING AND SIGNALING RUN-TIME PROGRAM CONDITIONS"

This related invention is an improvement to a generalized method and system for handling conditions occurring during program execution in a computer system having a Condition Manager which handles programs written in multiple languages. The method involves generating and using a general signaling routine having object code for an external entry point suitable for linking to application programs written in any language supporting external calls such as Pascal, FORTRAN, C, and COBOL. The signaling routine, when called by a program, signals a condition to the Condition Manager, then returns to the caller. The signaling routine may be used by programs to eliminate the step of checking return codes from subroutines by coding the subroutine to automatically signal the proper condition to the Condition Manager which executes previously registered user defined condition handlers to properly respond to the condition. A general condition token which can serve as a feedback token is defined which is composed of a condition identifier, a format code for the condition identifier, a severity code for the condition, a control code for a facility identifier, a facility identifier and an optional handle identifying instance specific information. The signaling routine and the feedback token can be used by subroutines which can optionally provide for the passing of an address, where a feedback token can be stored. During execution, the subroutine monitors for conditions. If the severity of a detected condition is greater than a threshold, the subroutine signals the condition to the Condition Manager, or else stores a feedback token at the passed address.

Using the foregoing specifications the invention may be implemented using standard programming techniques. The resulting program(s) may be stored on disk, diskettes, memory cards, ROM or any other memory device. For execution, the program may be copied into the RAM of the computer. Intermediate results will be stored in RAM. One skilled in the art of computer science will easily be able to combine the software created as described with appropriate general purpose or special purpose computer hardware to create a system. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A computer program product, comprising:
   a computer usable medium having computer readable program code means embodied in said medium for managing program execution, said computer readable program code means comprising:
   computer readable program code means for causing a computer to effect an initialization of an activation of a high level language application program including creating a process, an initial enclave within the process and an initial thread of execution within the initial enclave, wherein said enclave is a logical run-time structure defining a scope of high level language semantics;
   computer readable first program code means for causing said computer to effect an execution of one or more requests from the initial thread to create an additional thread for concurrent execution with the initial thread in the initial enclave;
   computer readable second program code means for causing said computer to effect an execution of one or more requests from one of said threads to create an additional enclave in the process and to create a first thread of execution within said additional enclave; and
   computer readable third program code means for causing said computer to effect an execution of global high level language statements, in one of the threads, that are within the scope of high level language semantics of the enclave containing said one of the threads.

2. The computer program product of claim 1 further comprising computer readable program code means for causing said computer to effect an execution of one or more requests from said additional thread to create another thread.

3. The computer program product of claim 1 further comprising computer readable program code means for causing said computer to effect an execution of a request from one of the threads to create a second process with an associated enclave and thread of execution.

4. The computer program product of claim 1 further comprising computer readable program code means for causing said computer to effect an execution of a request from said high level language application program to terminate the process, thereby causing all enclaves and threads in the process to be terminated.

5. The computer program product of claim 1 wherein said computer readable second program code means further comprises:
   computer readable program code means for causing said computer to effect a suspension of execution of the thread which created the additional enclave; and
   computer readable program code means for causing said computer to effect a transferral of control to a main routine of the additional enclave making it the current enclave.

6. The computer program product of claim 1 wherein said enclaves contain procedures written in a plurality of high level languages, said enclaves containing a first procedure written in a first language, and also containing a second procedure written in a second language, said first and second languages being different,
   wherein said computer readable program code means can operate in a plurality of operating system environments, and
   wherein said plurality of operating system environments includes any of the following:
   IBM MVS, VM/CMS, OS/2, CICS, and OS/400.

7. The computer program product of claim 1 further comprising computer readable program code means for causing said computer to effect a termination of the initial or additional enclave upon occurrence of at least one of the following events:
   a request is made to terminate the initial or additional enclave;
   execution of a high level language stop statement in the initial or additional enclave;
   execution of a return from the main routine of the initial or additional enclave; and
   termination of the associated initial or first thread of the initial or additional enclave.

8. The computer program product of claim 1, wherein said logical runtime structure comprises a program execution time logical entity describing various aspects of program execution behavior.

9. The computer program product of claim 1, wherein said enclave defines at least one of the following:
   a scope of the definition of main and sub procedures;
   a scope of sharing of external data;
   a scope of sharing of external files;
   language statements that terminate execution of an outermost program unit known to the language;
   a scope of the target of GOTO out of block;
   a scope and visibility of automatic, static local, and static external data;
   a scope of sharing of heap storage; and
   an outer bound of condition management semantics.

10. The computer program product of claim 5 further comprising:
   computer readable program code means for causing said computer to effect an execution of a request to terminate the current enclave, thereby causing all threads in the current enclave to be terminated; and
   computer readable program code means for causing said computer to effect a termination of the process if the current enclave is the only enclave of the process which has not been terminated, else resuming execution of the thread which created the additional enclave.

11. The computer program product of claim 10 further comprising computer readable program code means for causing said computer to effect a signaling of a termination condition for the current enclave before performing the termination.

12. A program storage device readable by a machine, tangibly embodying a program of instructions executable by the machine to perform method steps comprising:
   initializing an activation of a high level language application program including creating a process, an initial enclave within the process and an initial thread of execution within the initial enclave, wherein said enclave is a logical run-time structure defining a scope of high level language semantics;
   executing one or more requests from the initial thread to create an additional thread for concurrent execution with the initial thread in the initial enclave;
   executing one or more requests from one of said threads to create an additional enclave in the process and to create a first thread of execution within said additional enclave; and
   executing global high level language statements, in one of the threads, that are within the scope of high level language semantics of the enclave containing said one of the threads.

13. The program storage device of claim 12 further including the performance of the step of executing one or more requests from said additional thread to create another thread.

14. The program storage device of claim 12 further including the performance of the step of executing a request from one of the threads to create a second process with an associated enclave and thread of execution.

15. The program storage device of claim 12 further including the performance of the step of executing a request from said high level language application program to terminate the process; thereby causing all enclaves and threads in the process to be terminated.

16. The program storage device of claim 12 further including the performance of the steps of:
   suspending execution of the thread which created the additional enclave; and
   transferring control to a main routine of the additional enclave making it the current enclave.

17. The program storage device of claim 12 further including the performance of the step of terminating the initial or additional enclave upon occurrence of at least one of the following events;
   a request is made to terminate the initial or additional enclave;
   execution of a high level language stop statement in the initial or additional enclave;
   execution of a return from the main routine of the initial or additional enclave; and
   termination of the associated initial or first thread of the initial or additional enclave.

18. The program storage device of claim 12, wherein said enclaves contain procedures written in a plurality of high level languages, said enclaves containing a first procedure written in a first language, and also containing a second procedure written in a second language, said first and second languages being different.

19. The program storage device of claim 12, wherein said logical runtime structure comprises a program execution time logical entity describing various aspects of program execution behavior.

20. The program storage device of claim 12, wherein said enclave defines at least one of the following:
   a scope of the definition of main and sub procedures;
   a scope of sharing of external data;
   a scope of sharing of external files;
   language statements that terminate execution of an outermost program unit known to the language;
   a scope of the target of GOTO out of block;
   a scope and visibility of automatic, static local, and static external data;
   a scope of sharing of heap storage; and
   an outer bound of condition management semantics.

21. The program storage device of claim 16 further including the performance of the steps of:
   executing a request to terminate the current enclave, thereby causing all threads in the current enclave to be terminated; and
   terminating the process if the current enclave is the only enclave of the process which has not been terminated, else resuming execution of the thread which created the additional enclave.

22. The program storage device of claim 21 further including the performance of the step of signaling a termination condition for the current enclave before performing the termination.

* * * * *